United States Patent [19]

Wang

[11] Patent Number: 5,169,520
[45] Date of Patent: Dec. 8, 1992

[54] FILTER FOR A WATER TANK

[76] Inventor: Yao C. Wang, No. 67, Lane 224, Sec. 1, Tatung Rd., Yuanlin Chen, Changhua Hsien, Taiwan

[21] Appl. No.: 792,304

[22] Filed: Nov. 4, 1991

[51] Int. Cl.⁵ ............................................ A01K 63/04
[52] U.S. Cl. .................. 210/169; 210/416.2; 119/5
[58] Field of Search .................. 210/169, 416.2; 119/5

[56] References Cited

U.S. PATENT DOCUMENTS

| | | | |
|---|---|---|---|
| 3,151,069 | 9/1964 | Halpert | 210/169 |
| 3,487,440 | 12/1969 | Newsteder | 119/5 |
| 3,630,367 | 12/1971 | Willinger | 210/169 |
| 4,186,093 | 1/1980 | Willinger | 210/169 |
| 4,295,965 | 10/1981 | Koster | 210/169 |
| 4,392,953 | 7/1983 | Cornelius et al. | 210/169 |
| 4,753,723 | 6/1988 | Willinger | 210/169 |
| 4,802,980 | 2/1989 | Gilkey et al. | 210/169 |
| 4,944,871 | 7/1990 | Ogawa | 210/169 |
| 5,011,600 | 4/1991 | Mowka, Jr. et al. | 210/169 |
| 5,059,315 | 10/1991 | Senape | 210/169 |
| 5,062,951 | 11/1991 | Tominaga | 210/169 |

Primary Examiner—Stanley S. Silverman
Assistant Examiner—Robert James Popovics
Attorney, Agent, or Firm—William E. Pelton

[57] ABSTRACT

A filter for a tank including a base, a casing disposed on the base, a partition plate separating the casing into a room and a space, a filter material disposed in the room, the casing including a number of holes formed in a bottom of the room and including a wall having a number of orifices in communication with the space, water being cleaned and filtered by the filter materials and flowing into the base as clean water, a tube extended into the base, a pump disposed above the tube for pumping the clean water to an upper portion of the tank via the tube.

3 Claims, 4 Drawing Sheets

FILTER FOR A WATER TANK

BACKGROUND OF THE INVENTION

1. Field of the Invention

The present invention relates to a filter, and more particularly to a filter for a water tank, especially for an aquarium.

2. Description of the Prior Art

Filter is generally provided in an aquarium for filtering out dirt and impurities. However, most of the filters which are available at present can not operate effectively.

The present invention has arisen to mitigate and/or obviate the afore-described disadvantages of the conventional filters.

SUMMARY OF THE INVENTION

The primary objective of the present invention is to provide a filter for a water tank in which the filter operates effectively.

In accordance with one aspect of the invention, there is provided a filter for a tank including a base, at least one casing disposed on the base and having a partition plate disposed therein so as to separate the casing into a room and a space, a filter material disposed in each of the rooms, the casing including a number of holes formed in a bottom of the room and including a wall having a number of orifices formed therein in communication with the space so that water contained within the tank may flow into the space and may flow over the partition plate into the room, the water being cleaned and filtered by the filter materials and flowing into the base as clean water, a tube disposed in the space and having a lower end extended into the base, a pump disposed above the tube for pumping the clean water to an upper portion of the tank via the tube.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
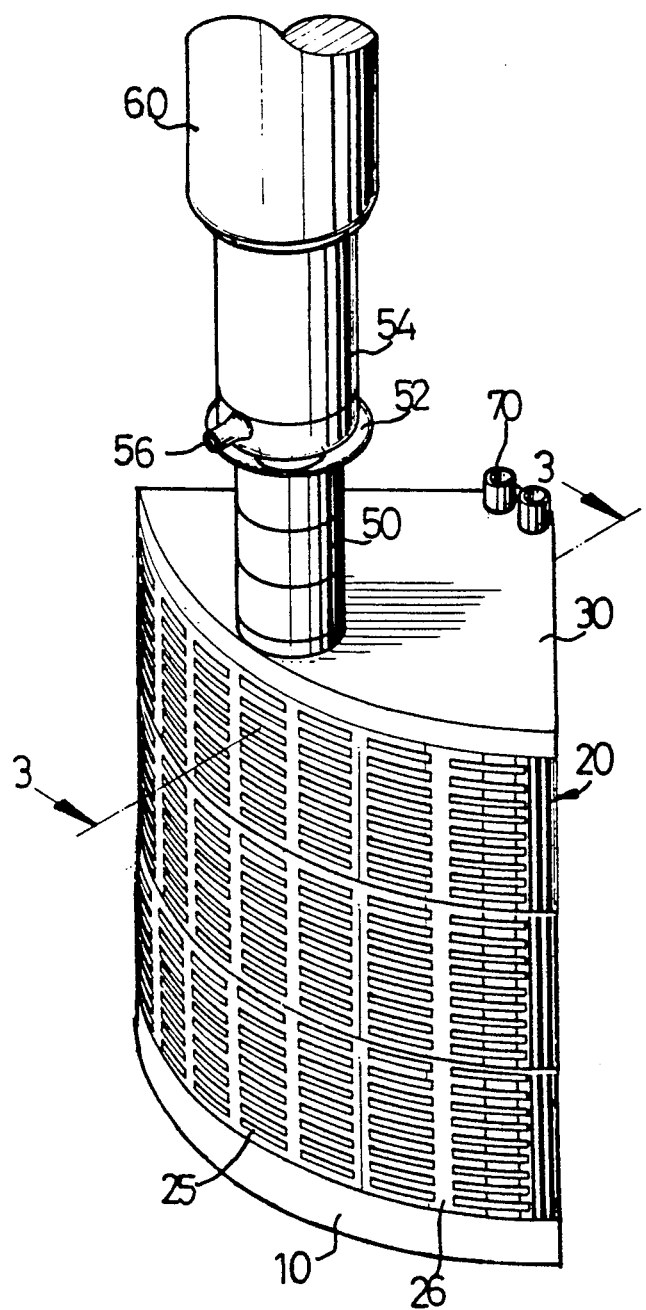
FIG. 1 is a perspective view of a filter in accordance with the present invention.
Figure 2:
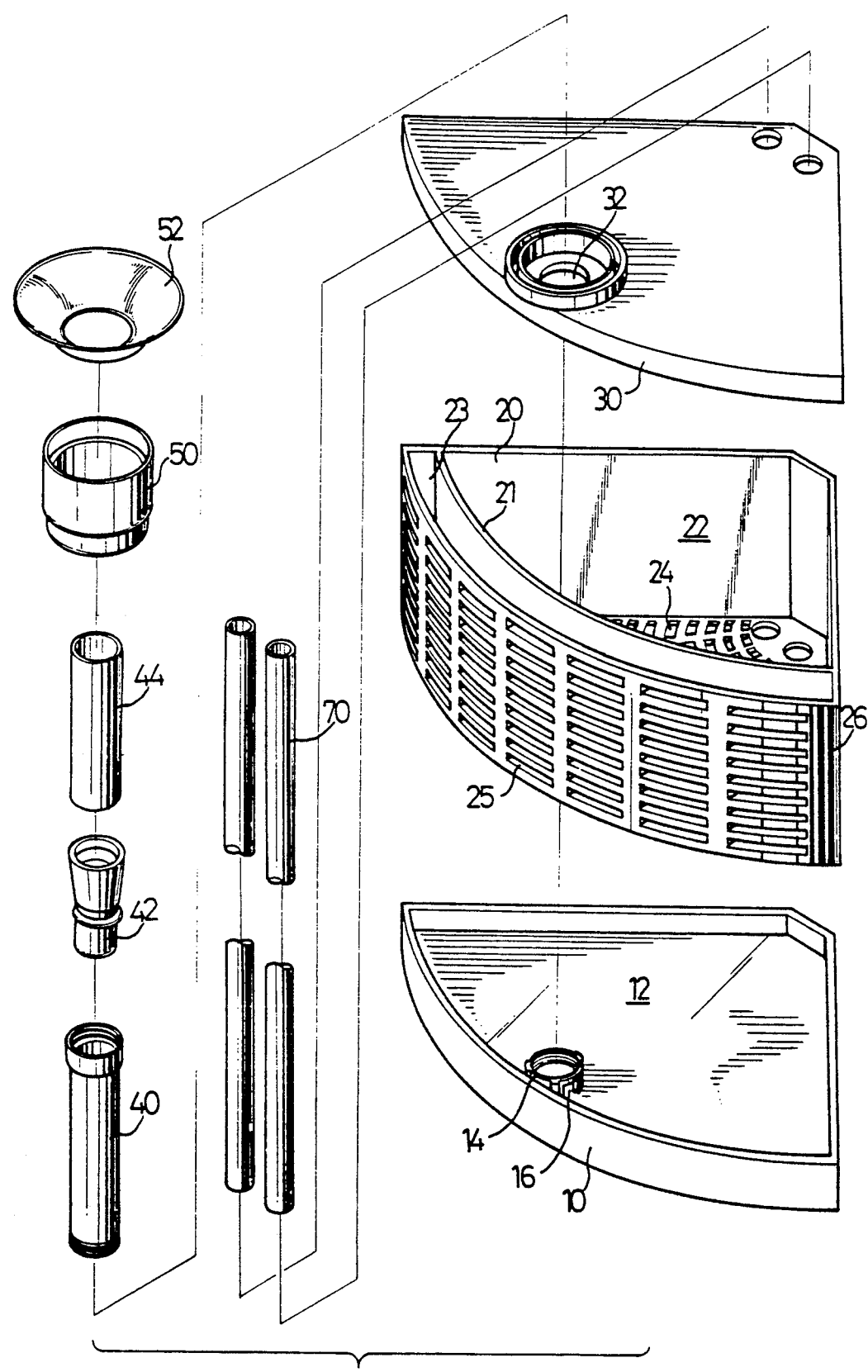
FIG. 2 is an exploded view of the filter.
Figure 3:
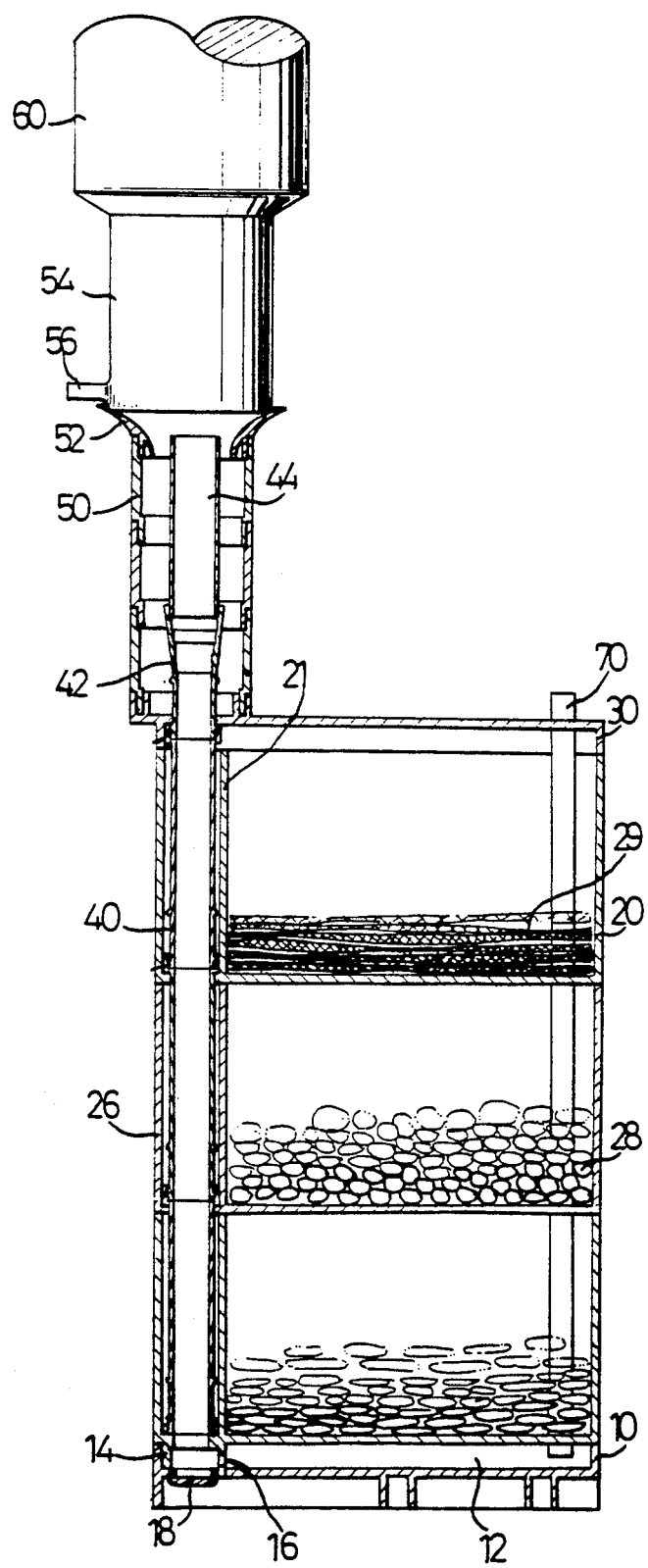
FIG. 3 is a cross sectional view taken along lines 3—3 of FIG. 1.

Referring to the drawings and initially to FIGS. 1, 2 and 3, a filter in accordance with the present invention is generally disposed in the corner area of a water tank, such as an aquarium for filtering the dirt and impurities. The filter comprises generally a base 10, three casings 20 disposed on the base 10, a cap 30 disposed on the casings 20, and a motor 60 disposed on the cap 30 for pumping water. The base 10, the casings 20 and the cap 30 are preferably immersed in the water contained in the water tank.

The base 10 has a shape of a quadrant and defines a cavity 12 and includes a hub 14 disposed therein. The hub 14 includes at least one access 16 formed therein. A lid 18 is engaged in the lower end of the hub 14. The casings 20 are disposed between the base 10 and the cap 30 and are substantially in the shape of quadrants similar to that of the base 10. A partition plate 21 is formed in each of the casings 20 so as to separate the casings 20 into a room 22 and a curved space 23. A plurality of holes 24 are formed in the bottom of each of the casings 20. The casing 20 has a curved wall 26 having a plurality of orifices 25 formed therein so that water contained in the water tank is allowed to flow into the space 23. The cap 30 includes an aperture 32 formed therein. A filter material 28 is disposed in each of the casings 20, for example, a plurality layers of filter films 29 are disposed in the uppermost casing 20.

A tube 40 is provided in each of the spaces 23. The tubes 40 are coupled together by such as threaded engagement. The lowermost tube 40 is aligned and engaged with the hub 14 and arranged such that water contained within the base 10 may flow into the tube 40 via the accesses 16 of the hub 14. The uppermost tube 40 extends upward through the aperture 32 of the cap 30. A coupler 42 and a pipe 44 are connected to the tubes 40 and disposed above the tubes 40. Three sleeves 50 (FIG. 3) which are engaged with one another are disposed on the cap 30 and are disposed around the coupler 42 and the pipe 44. A member 52 which has a shape of a funnel is disposed above the sleeves 50. The motor 60 is disposed above a barrel 54 which is disposed above the member 52, and has a mouth 56 provided thereon.

Figure 4:
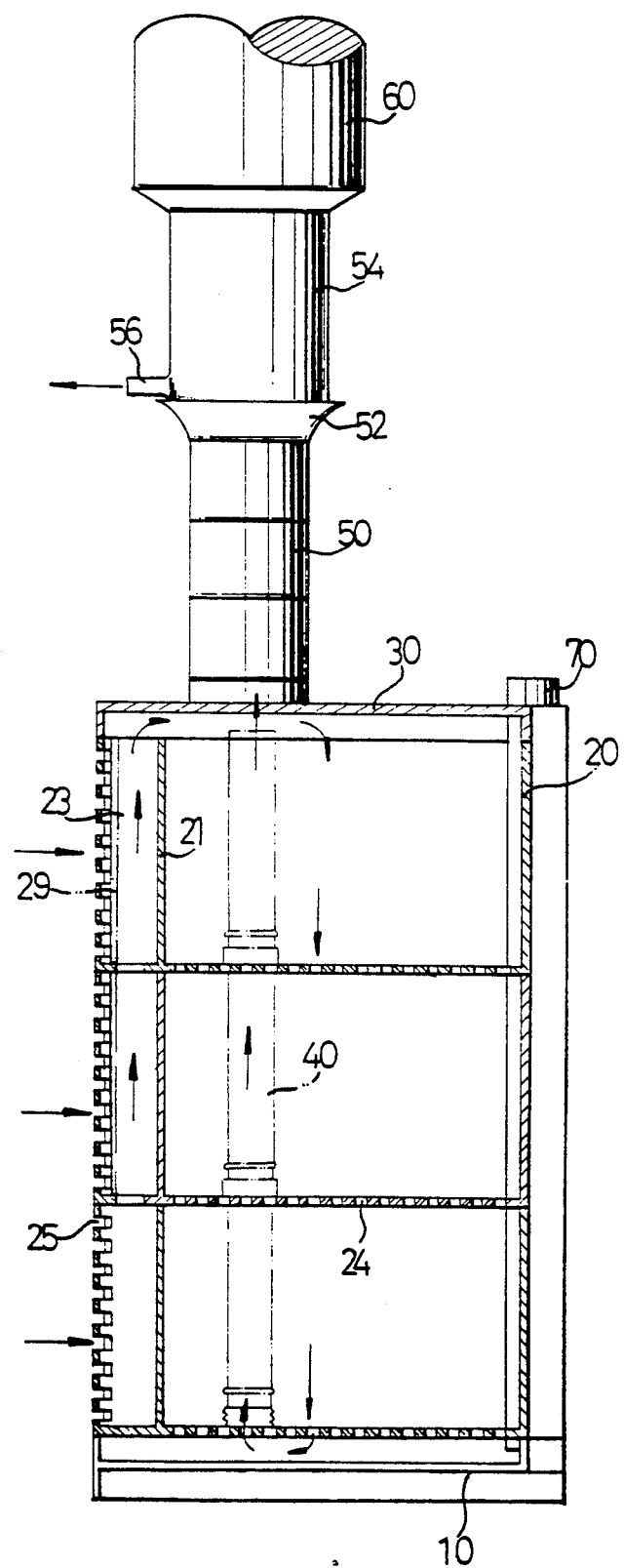
FIG. 4 is a cross sectional view similar to FIG. 3, in which, for clarity purposes, the filtering materials are removed.

Referring next to FIG. 4, in operation, water is cleaned and filtered after flowing through the filter materials 28 accommodated within the rooms 22 of the casings 20 so that the water flowing into the cavity 12 of the base 10 is clean water. The clean water contained in the base 10 is caused to flow into the hub 14 via the accesses 16 and is pumped through the tubes 40 by the pump 60 so that clean water may flow out of the mouth 56 of the barrel 54. When the pump 60 operates, water contained within the casings 20 is caused to circulate downward to the base 10 so that water flowing into the spaces 23 of the casings 20 is caused to circulate and flow over the partition plate 21 of the uppermost casing 20 so that the water may flow into the casings 20.

Generally, water in the upper level of the water tank is cleaner than that in the lower lever, and the impurities tend to be precipitated in the bottom of the water tank. Accordingly, a separate partition plate 29, as shown in dotted lines in FIG. 4, can be disposed in the space 23 of each of the two upper casings 20 so that cleaner water is prevented from entering into the spaces 23 of the upper casings 20.

As shown in the drawings, two ducts 70 extend into the base 10 for supplying oxygen into the clean water contained in the base 10.

Accordingly, the filter in accordance with the present invention can be operated effectively.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A filter for a tank comprising a base having a hub formed therein, said hub including at least one opening formed therein, at least two casings disposed on said base and including a lower casings disposed on said base and an upper casing disposed above said lower casing, a cap disposed on said upper casing, at least one duct extended through said cap and said casings and extended into said base supplying air into said base, each of said casings having a partition plate disposed therein so as to separate each of said casings into a room and a space, a filter material disposed in each of said rooms, each of said rooms including a plurality of holes formed in a bottom thereof, each of said spaces being defined by one of said partition plates and a wall having a plurality of orifices formed therein in order to communicate said space with said tank so that water contained within said tank may flow into said spaces, each of said spaces including a tube disposed therein, said tubes being connected with each other, said tube disposed in said lower casing having a lower end extended into said base and connected with said hub so that said tubes are communicated with said base via said opening of said hub, a coupler and a pipe connected to said tube disposed in said upper casing, at least one sleeve disposed above said cap and provided around said coupler and said pipe, means disposed above said sleeve for pumping said water from said base through said opening of said hub to an upper portion of said tank via said tube wherein water from the tank in said spaces flows over said partition to said rooms and is cleaned and filtered by said filter materials and flows into said base as clean water.

2. A filter according to claim 1, wherein a funnel member is disposed above said sleeve, and a barrel is disposed above said funnel member and has an outlet tube provided therein wherein said clean water pumped through said tubes flows out of said outlet tube of said barrel via said coupler and said pipe.

3. A filter according to claim 1, in which a second partition plate is disposed in said space of said upper casing for covering said orifices of said wall of said upper casing to prevent water contained in said tank from flowing into said space of said upper casing.

* * * * *